US007936748B2

(12) United States Patent
Andersson et al.

(10) Patent No.: US 7,936,748 B2
(45) Date of Patent: May 3, 2011

(54) METHOD AND APPARATUS FOR CONNECTING A NETWORK DEVICE TO A DAISY CHAIN NETWORK

(75) Inventors: Jan Olof Andersson, Apple Valley, MN (US); Kenneth John Lockhart, Surrey (CA); Trevor Lewis Rossner, Surrey (CA); Jeffrey Paul Wiedemann, Apple Valley, MN (US); Logan Brent Grauer, Regina (CA); Chris Edwin Kasian, Regina (CA); William Andrew Perrin, Surrey (CA); Robert Christopher Kwong, Surrey (CA); Glenn William Nichols, Surrey (CA); Jason John Lemon, Regina (CA)

(73) Assignee: Uponor Innovations AB, Fristad (SE)

( * ) Notice: Subject to any disclaimer, the term of this patent is extended or adjusted under 35 U.S.C. 154(b) by 348 days.

(21) Appl. No.: 11/719,378

(22) PCT Filed: Dec. 17, 2004

(86) PCT No.: PCT/US2004/042978
§ 371 (c)(1),
(2), (4) Date: Sep. 8, 2008

(87) PCT Pub. No.: WO2006/055013
PCT Pub. Date: May 26, 2006

(65) Prior Publication Data

US 2010/0061396 A1 Mar. 11, 2010

(51) Int. Cl.
*H04L 12/50* (2006.01)
*H04L 12/28* (2006.01)

(52) U.S. Cl. .......................................... 370/359; 370/419

(58) Field of Classification Search .................. 370/359, 370/419
See application file for complete search history.

(56) References Cited

U.S. PATENT DOCUMENTS

| | | | |
|---|---|---|---|
| 5,414,708 | A | 5/1995 | Webber et al. |
| 5,953,540 | A | 9/1999 | Raymond et al. |
| 6,611,537 | B1 | 8/2003 | Edens et al. |

(Continued)

FOREIGN PATENT DOCUMENTS

| | | |
|---|---|---|
| GB | 2325124 | 11/1998 |

(Continued)

OTHER PUBLICATIONS

International Search Report PCT/US2004/038992 dated Jul. 29, 2005.

(Continued)

*Primary Examiner* — Andrew Lee
(74) *Attorney, Agent, or Firm* — Frost Brown Todd LLC

(57) ABSTRACT

A network device configured to allows the connection of the network device to a network in a daisy chain configuration using a single cable. The network device is connected to a cable with two conductors by a socket that is adapted to receive a plug connected to the end of the cable. When the plug on the end of a cable is inserted into the socket, a first conductor in the cable is connected to an input port of a network component and a second conductor of the cable is connected to an output port of a network component. A signal from the network is transmitted down a first conductor in a cable to a network device and the signal is then transmitted back from the network device down a second conductor in the same cable.

24 Claims, 9 Drawing Sheets

U.S. PATENT DOCUMENTS

| | | | | |
|---|---|---|---|---|
| 7,218,713 | B1 * | 5/2007 | Dupuie | 379/142.13 |
| 7,317,681 | B1 * | 1/2008 | Ben-Dvora et al. | 370/224 |
| 7,405,719 | B2 * | 7/2008 | Kobayashi | 345/98 |
| 7,555,409 | B1 * | 6/2009 | Bhaskar et al. | 702/185 |
| 2002/0172218 | A1 * | 11/2002 | Harrison | 370/449 |
| 2003/0084112 | A1 * | 5/2003 | Curray et al. | 709/208 |
| 2003/0179868 | A1 * | 9/2003 | Binder | 379/90.01 |
| 2004/0025047 | A1 * | 2/2004 | Mayne et al. | 713/200 |
| 2004/0122738 | A1 * | 6/2004 | Lum | 705/21 |
| 2004/0224627 | A1 | 11/2004 | Becelaere et al. | |

FOREIGN PATENT DOCUMENTS

| | | |
|---|---|---|
| WO | WO 99/63698 | 12/1999 |
| WO | WO 02/15346 | 2/2002 |

OTHER PUBLICATIONS

International Search Report PCT/US2004/042978 dated Aug. 1, 2005.

International Search Report PCT/US2004/042931 dated Jul. 29, 2005.

David R. Frick & Co.: "Networking Topologies" Internet Article, 'Online Feb. 18, 2000, XP002338737 Retrieved from the Internet: <URL: http://www.frick-cpa.com/netess/Net_T_opos.asp>' retrieved on Aug. 1, 2005! The whole document.

Anonymous: "Presence Sensing Safety Devices: Safety Mits" Internet Article, Online Dec. 6, 2003, pp. 2-88-2-89, XPO02338425 Retrieved from the Internet : URL:http://web.archive.org/web/20031206125042/http://www.ab.com/catalogs/safety/prodtypepdf/ch2/2-88-_2-89.pdf>pp. 2-88-pp. 2-89.

* cited by examiner

METHOD AND APPARATUS FOR CONNECTING A NETWORK DEVICE TO A DAISY CHAIN NETWORK

This invention is in the field of network connector devices and more specifically systems for connecting networks in a daisy chain configuration.

BACKGROUND

Daisy chaining is the simplest way to connect a network. Devices connected by a daisy chain are, connected one to another in series and a message that is sent on the network has to travel down the chain from one device to another. Compared to other network topologies, daisy chaining is relatively slow, however in applications that do not require large amounts of data transfer and fast transfer rates, daisy chaining is a common practice and daisy chain networks are common in industrial control networks.

One common standard that uses a daisy chain configuration for networking devices is the RS-485 standard. While RS-485 devices may be quite common, there are other protocols that specify or can use a daisy chain network configuration such as Apple's LocalTalk™ and many types of industrial applications.

While networked devices using the RS-485 protocol have always been common in industrial systems, such as larger scale heat and ventilation systems, with the decrease in price of control systems, smaller scale control systems are becoming more common. One area using networked devices that can use a daisy chain topology is home automation and especially home HVAC systems.

In order to setup devices in a daisy chain network, a cable has to be strung to each of the devices in the network. With the exception in some cases of the first and last devices in a daisy chain network, each device in the network requires a cable running to it from a previous device and another cable running from it to the next device.

Daisy chaining connections utilize termination resistors on each end of the network to ensure that every transceiver is directly connected to the main current path. Transceivers placed outside the termination resistors daisy chain may not be able to correctly sense the voltage drop and "hear" the transmission. In this way "star" wiring configurations are not allowed for daisy chained networks such as RS-485.

The disadvantage of wiring the network in this fashion is that there must be some overall plan to the creation of the network. The devices must be planned to some degree because a cable running from the previous device must be connected to the device and a different cable must be run to the next device. This requires the person setting up the network to know where the previous device is as well as the location of the next device. Knowing the placements of the devices may not be overly complicated when the network is small and centralized in one area, but often these daisy chain networks have long distances between devices and these devices might be in different locations that are not in sight of each other. For example, in a HVAC system for a house, the devices connected to the chain network will typically be a controller near the furnace and a number of thermostats connected to the daisy chain network and spread throughout the house. Each thermostat device connected to the network will likely be situated in a different room or location of the house from other devices and it will not always be easy to determine in which direction to run the cable to and from each device.

Additionally, some of the protocols such as RS-485 networks require a termination resistor at the end of the network.

This requires one of the devices to serve as the last device and the network must be planned to end at the device that has the termination resistor in it.

Not only must the daisy chain network be planned to some degree, but it can also be complicated to add new devices to the network. To add a new device, the network must be disconnected from one of the device and the new device incorporated into the chain. Again, the location of the previous device and next device must be known, which might not be that easy to determine if the network is spread throughout a large building and numerous rooms.

The different standards for daisy chain networks also specify the type of cable that is required in order to connect the devices. RS-485, for example, specifies certain minimum standards for cable and requires the cable to be a twisted pair in order to use balanced differential signals to reduce or eliminate the effect of interference in the cables.

There are many cables available that meet the recommendations for the different daisy chain network protocols and there are cables that are specially designed for use with these applications. These cables are quite specialized and although daisy chain networks are common, they are not as common as other more standard types of networks. This often makes the special cabling more costly and harder to find because of its lower production. Also, electricians are often not familiar with these types of specialty cables.

In more recent years a number of more standard cable specifications have arisen that are not specifically made for daisy chain networks. One very common type of standard cable is referred to as Category 5 cabling. These standardized cables often include a number of conductors or wire strands and standardized connections to increase the ability of these standard cables to be used in a number of different applications i.e. category 5 consists of four twisted pairs of copper wire terminated by RJ45 connectors.

Because these standard cables can be used in so many applications and circumstances and some, like Category 5 wire, are in common use, they are manufactured in very large quantities which generally makes them cheaper than other specialty cables, easier to find and electricians and other installers are more often more familiar with their use.

SUMMARY OF THE INVENTION

It is an object of the present invention to provide a system and apparatus that overcomes problems in the prior art.

The present invention provides, in a first embodiment, a master network device for creating a network in a daisy chain configuration. The master network device comprises a network component configured to operate on a daisy chain network and comprising an output port and an input port for connection to the daisy chain network; and a connector hub operative to connect a plurality of network devices in a daisy chain network with cables, wherein each cable comprises two conductors. The connector hub comprises a plurality of sequential cable interfaces including a first cable interface and a last cable interface, each cable interface comprising a pair of conductor connectors, each conductor connector operative to connect one conductor of a connected cable to a connecting circuit. The connecting circuit is configured such that one of the conductor connectors of the first cable interface is connected to the output port of the network component and the other of the conductor connectors of the first cable interface is connected to one of the conductor connectors of a next cable interface; the other of the conductor connectors of the next cable interface is connected to one of the conductor connectors of a succeeding cable interface, and conductor connectors of the subsequent succeeding cable interfaces are connected sequentially in the same manner; and the other of the conductor connectors of the last cable interface is connected to the input port of the network component.

The present invention provides, in a second embodiment, connector hub to connect a plurality of network devices in a daisy chain network with cables, wherein each cable comprises two conductors. The connector hub comprises a connecting circuit; a primary network device interface comprising a pair of conductor connectors, each conductor connector operative to connect a conductor to the connecting circuit; and a plurality of sequential cable interfaces including a first cable interface and a last cable interface, each cable interface comprising a pair of conductor connectors, each conductor connector operative to connect one conductor of a connected cable to the connecting circuit. The connecting circuit is configured such that one of the conductor connectors of the first cable interface is connected to one of the conductor connectors of the primary network device interface and the other of the conductor connectors of the first cable interface is connected to one of the conductor connectors of a next cable interface and the other of the conductor connectors of the next cable interface is connected to one of the conductor connectors of a succeeding cable interface; conductor connectors of the subsequent succeeding cable interfaces are connected sequentially in the same manner; and the other of the conductor connectors of the last cable interface is connected to the other, conductor connector of the primary network device interface.

The system allows connection of each of a plurality of network devices in a daisy chain configuration to a central location in a network. Each network device is connected to a cable with two conductors. From the central location, a signal is transmitted down a first conductor in a cable to a network device and the signal is then transmitted back from the network device down a second conductor in the cable. From the central location, the signal is then transmitted down the next cable to the next network device. The cable connections can be made with a standard plug and socket such as are readily available. In this manner, networks that operate on a daisy chain can be wired from a central location in a home run or free-form manner, yet maintain the daisy chain configuration.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
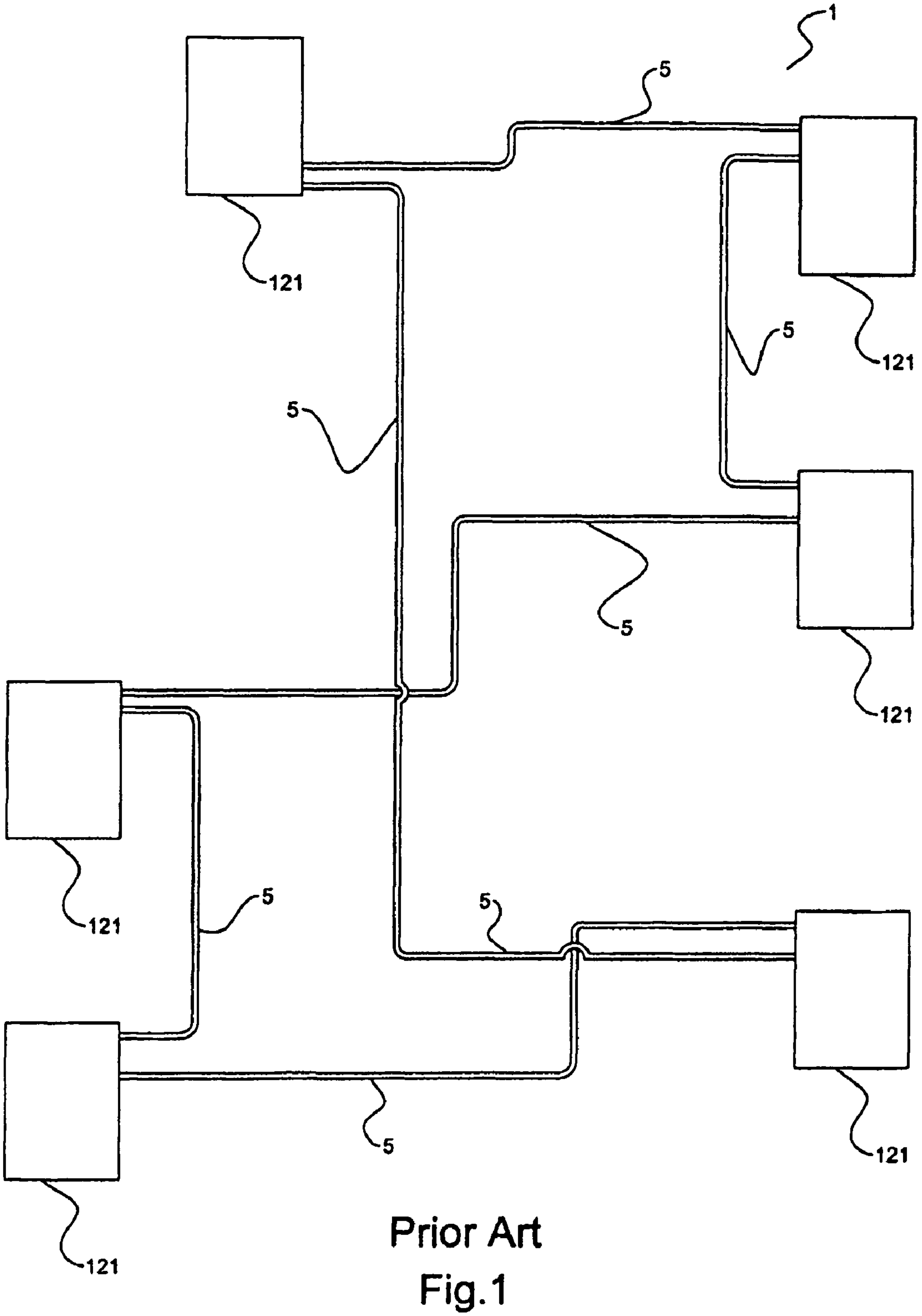
Prior Art Fig.1
FIG. 1 is a schematic diagram of a network in a daisy chain configuration in accordance with the prior art.

FIG. 1 is a schematic illustration of a network 1 in a daisy chain configuration as known in the prior art. In network 1 a number of network devices 121 are connected by a plurality of network cables 5 that connect the network devices 121 in series. Network devices 121 can be any devices that can operate on a daisy chain configuration such as devices that use the RS485 standard. The network cable 5 has a single conductor and in the case of a daisy chain network operating using the RS485 standard, the single conductor would be a twisted pair of copper wires.

In FIG. 1 each network device 121 is connected to two network cables 5. The network is a chain where each network device 121 is connected to two network cables 5, one network cable 5 connecting the network device 121 to the previous network device 121 and another network cable 5 connecting the network device 121 to the next network device 121.

If the network 1 is configured in a master/slave configuration that is fairly common in daisy chain configured network, one of the network devices 121 will be the master device on the network 1 and the rest of the network devices 121 will be slave devices controlled by the master device.

The present invention uses network cable with at least two conductors in a network that allows each network device to be connected to the network by a single cable yet maintain the configuration of a daisy chain network.

Figure 2:
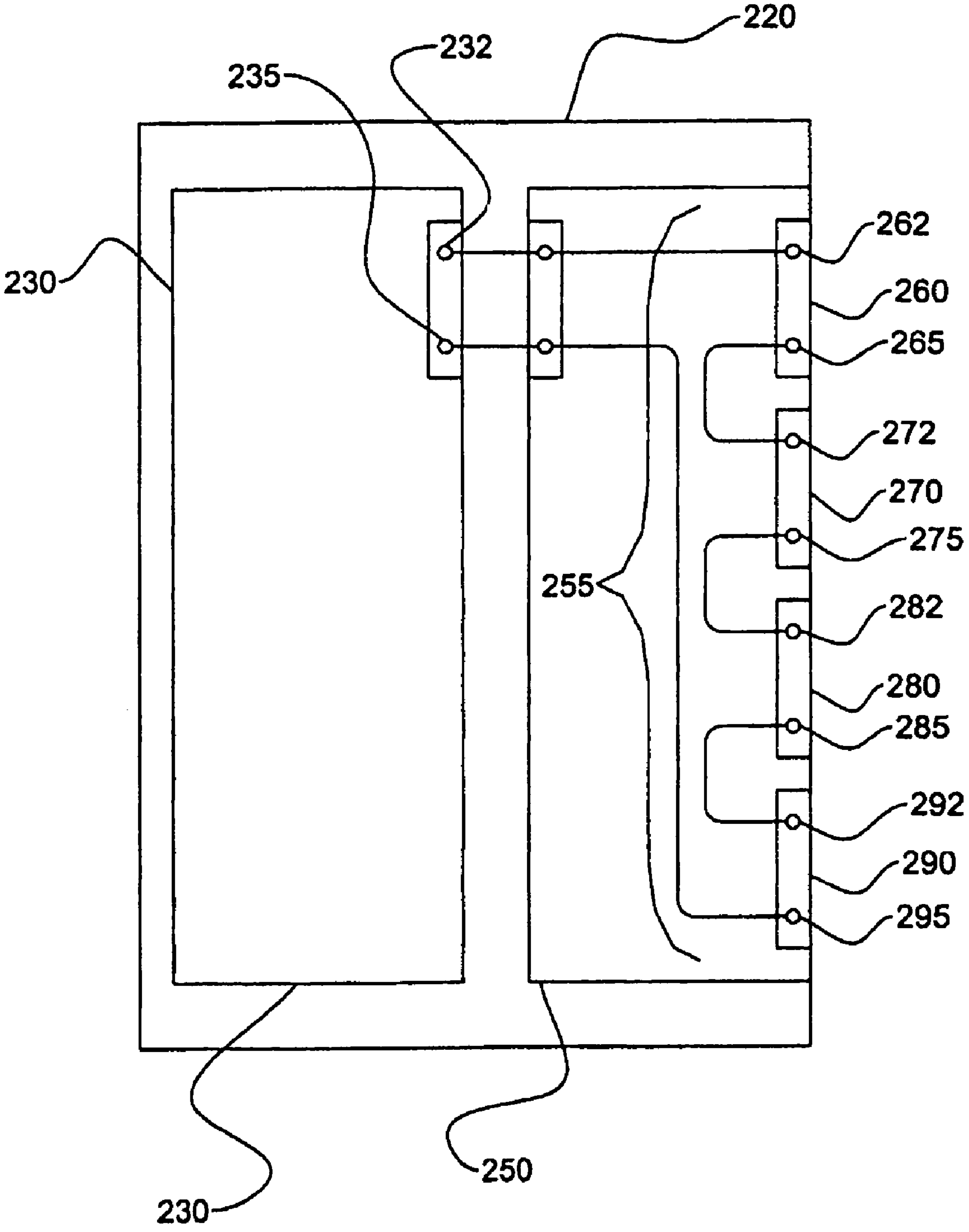
FIG. 2 is a schematic illustration of an embodiment of a master network device comprising a connector hub in accordance with the present invention.

FIG. 2 is a schematic illustration of a master network device 220. The master network device 220 comprises a network component 230 and a connector hub 250. The network component 230 could be any known device that can be connected to a network in a daisy chain configuration, i.e. a controller or other network device and would comprises an output port 232 and an input port 235 for connection to a network configured in a daisy chain. While the terms input and output are conveniently used in describing the invention, it will be understood by someone skilled in the art that if the network is configured to allow bi-directional communication, a port or connection termed an input in this description may transmit out a signal or a port or connection termed an output in this description might receive a signal. Also, typically devices configured to operate on a daisy chain configuration do not require a specific input connection or output connection and the connections can be interchanged without effecting the operation of the network device.

Typically, if the daisy chain network is configured in a master/slave configuration, the network component 230 would be configured as the master device of the network.

Alternatively, the network component 230 could be a serial to Ethernet (or other network standard) bridge. The network component 230 would comprise an internet or other non-daisy chain network connection 231 operative to connect the network component to another network. Typically, this network connection would be a conventional Ethernet or other network connection, but it could be a wireless connection such as one that operates on the 802.11 standard for connection to a wireless network. This would allow a daisy chain network created using the master network device 220 to be in a remote location accessible over the internet or other connection. Signal to be transmitted over a daisy chain network created by the master network device 220 could be encapsulated and sent over a network to the master network device 220 where the network component 230 strips out the encapsulated signal and transmits the signal onto the daisy chain network connected to the master network device 220. In this manner, the master network device 220 could serve as a bridge between a first daisy chain network in a remote location and a daisy chain network connected to the master network device 220.

The connector hub 250 allows the connection of the network component 230 to a number of different network devices (not shown) in a daisy chain configuration. Connector hub 250 comprises a first cable interface 260, a second cable interface 270, a third cable interface 280, a fourth cable interface 290 and a connection circuit 255.

The first cable interface 260 is operative to connect to a cable comprising at least two conductors and comprises a first conductor connector 262 connectable to a first conductor of a cable connected to the first cable interface 260 and a second conductor connector 265 connectable to another conductor of a cable connected to the first cable interface 260. Both the first conductor connector 262 and the second conductor connector 265 of the first cable interface 260 are connected to the connection circuit 255. The second cable interface 270 is operative to connect to a cable comprising at least two conductors and comprises a first conductor connector 272 connectable to a first conductor of a cable connected to the second cable interface 270 and a second conductor connector 275 connectable to another conductor of a cable connected to the second cable interface 270. Both the first conductor connector 272 and the second conductor connector 275 of the second cable interface 270 are connected to the connection circuit 255. The third cable interface 280 is operative to connect to a cable comprising at least two conductors and comprises a first conductor connector 282 that is connectable to a first conductor of a cable connected to the third cable interface 280 and a second conductor connector 285 that is connectable to another conductor of a cable connected to the third cable interface 280. Both the first conductor connector 282 and the second conductor connector 285 of the third cable interface 280 are connected to the connection circuit 255. The fourth cable interface 290 is operative to connect to a cable comprising at least two conductors and comprises a first conductor connector 292 that is connectable to a first conductor of a cable connected to the fourth cable interface 290 and a second conductor connector 295 that is connectable to another conductor of a cable connected to the fourth cable interface 290. Both the first conductor connector 292 and the second conductor connector 295 of the fourth cable interface 290 are connected to the connection circuit 255.

The connection circuit 255 operatively connects the output port 232 of the network component 230, the input port 235 of the network component 230, the first cable interface 260, the second cable interface 270, the third cable interface 280 and the fourth cable interface 290 in a daisy chain configuration. The output port 232 of the network component 230 is operatively connected by the connection circuit 255 to the first conductor connector 262 of the first cable interface 260. The second conductor connector 265 of the first cable interface 260 is operatively connected by the connection circuit 255 to the first conductor connector 272 of the second cable interface 270. The second conductor connector 275 of the second cable interface 270 is operatively connected by the connection circuit 255 to the first conductor connector 282 of the third cable interface 280. The second conductor connector 285 of the third cable interface 280 is operatively connected by the connection circuit 255 to the first conductor connector 292 of the fourth interface 290. The second conductor connector 295 of the fourth cable interface 290 is operatively connected by the connection circuit 255 to the input port 235 of the network component 230.

It will be readily understood by someone skilled in the art that the conductor could comprises a twisted wire pair and each conductor connector would be a pair of connectors to connect to each of the twisted wires in the pair.

Figure 8:
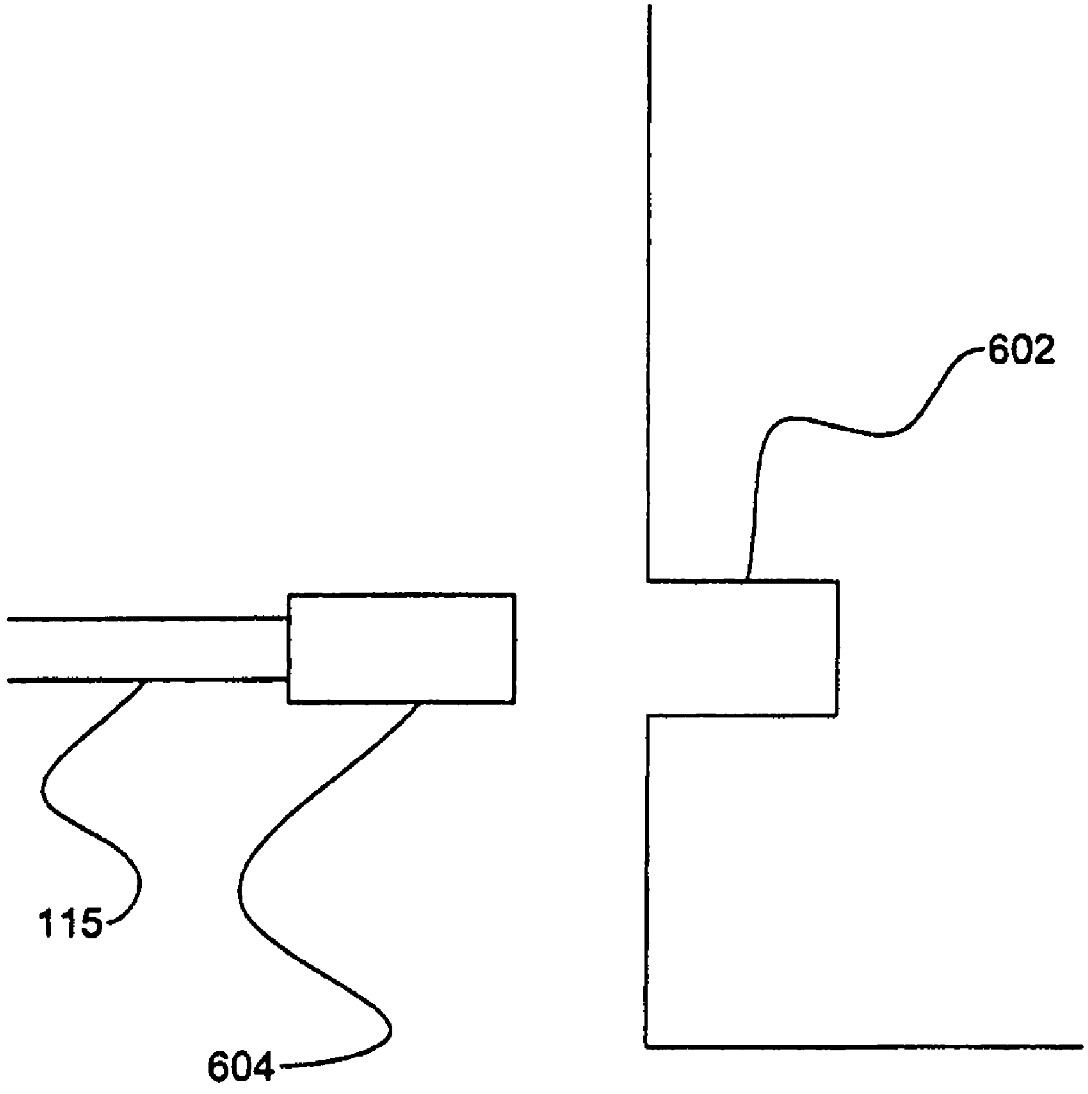
FIG. 8 illustrates a socket and mating plug for connection of a cable to a device in the network.

In one embodiment of the invention, as illustrated in FIG. 8, the cable interfaces 260, 270, 280 and 290 would comprise a socket 602 that is adapted to receive a plug 604 that is attached to the end of the cable 115 that is connectable to the cable interfaces 260, 270, 280 or 280. For example, it is contemplated that the socket could be adapted to receive a plug conforming to the RJ45 standard that is attached to the end of a cable conforming to the category 5 standard for cable. When the plug is inserted into the socket and the connection is made, the conductor connectors will be connected with the proper conductors in the cable.

Although FIG. 2 illustrates a connector hub 250 comprising four cable interfaces for connecting to four cables, it is contemplated that any practical number of additional interfaces could be incorporated into the connector hub 250 by simply extending the connecting circuit 255.

Figure 3:
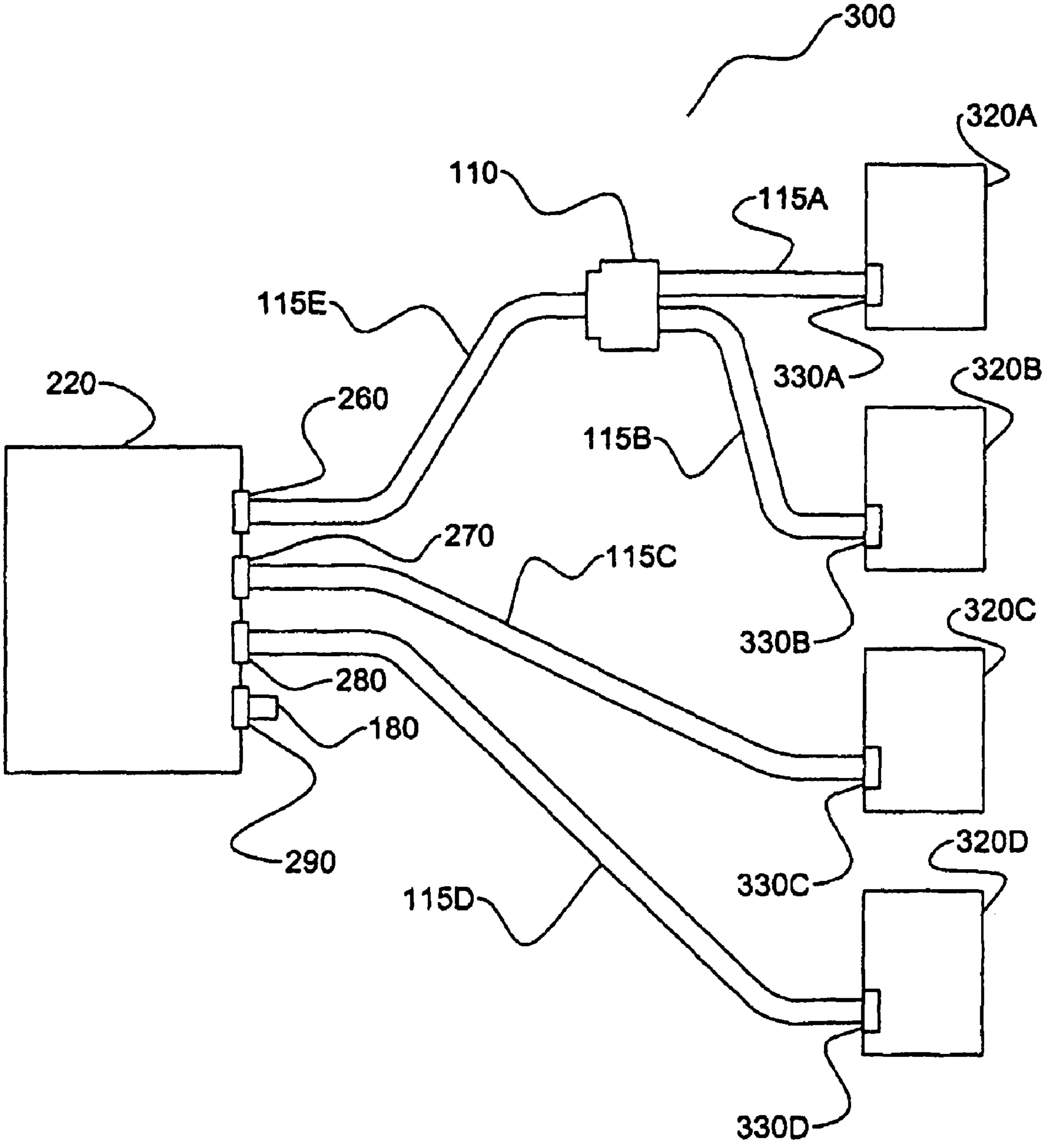
FIG. 3 illustrates a daisy chain configured network implemented using a master network device in accordance with the present invention.

FIG. 3 illustrates a daisy chain configured network 300 implemented using the master network device 220 of FIG. 2. The network 300 comprises: the master device 220; a number of network device 320A, 320B, 320C, and 320D; and a plurality of cables 115A, 115B, 115C, 115D and 115E; a shorting plug 180 and a connector device 110.

The master network device 220 comprises: first cable interface 260; second cable interface 270; third cable interface 280; and fourth cable interface 290.

The network devices 320A, 320B, 320C and 320D are network devices that require or allow connection to a daisy chain network, such as devices that can operate using the RS-485 standard. These devices could be any type of device that is useful to network in a daisy chain configuration, i.e. a number of input devices or control devices. If the network 300 is configured based on a master/slave relationship between the devices, the master network device 220 will be the controlling or master device and the network devices 320A, 320B, 320C and 320D would be slave devices.

The cables 115A, 115B, 115C, 115D and 115E comprise a first end and a second end and have at least two conductors. If the cables 115A, 115B, 115C, 115D and 115E are designed for connected network devices 320 that operate in accordance with the RS-485 standard, the two conductors will each be a twisted pair of copper wires and if the cable 115A, 115B, 115C, 115D and 115E is category 5 cable, the cable will consists of four copper wire pairs. The cables 115A, 115B, 115C, 115D and 115E could be terminated with any typical ends that allow connection to the components of the network 200, including the stripped wire ends, however, the ends would typically be RJ45 ends to allow quick snap connections to the network devices 320 in the network 300.

Figure 4:
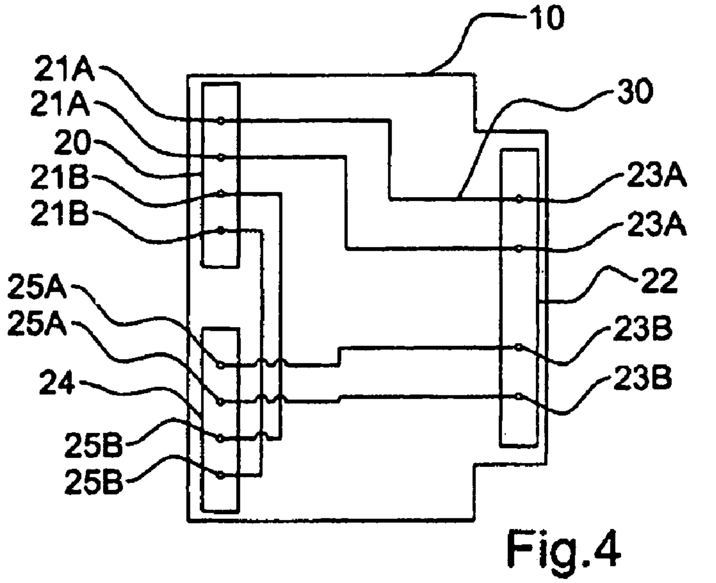
FIG. 4 is a schematic illustration of a connector device.
Figure 5A:
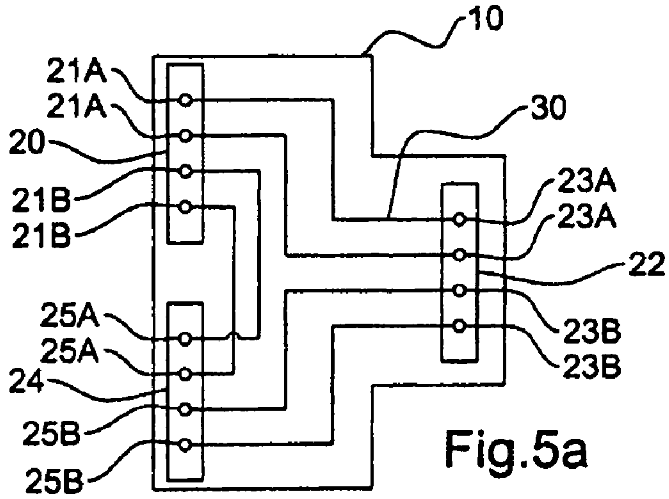
FIGS. 5*a* through 5*g* are schematic diagrams of connector devices with alternate connecting circuits.
Figure 5B:
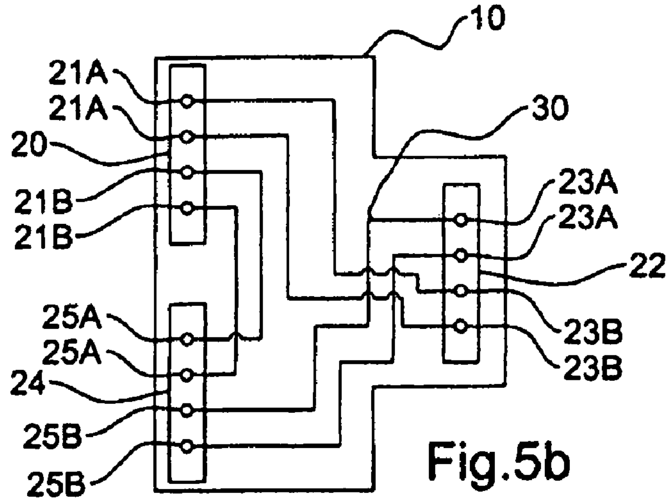
Figure 5C:
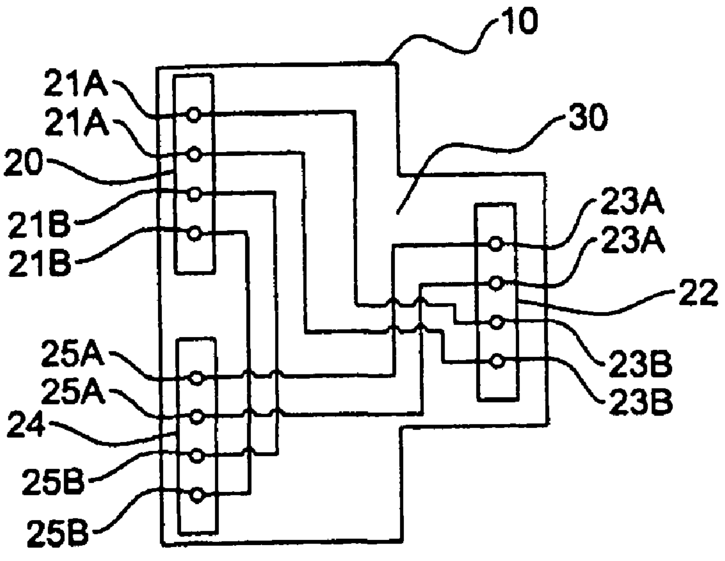
Figure 5D:
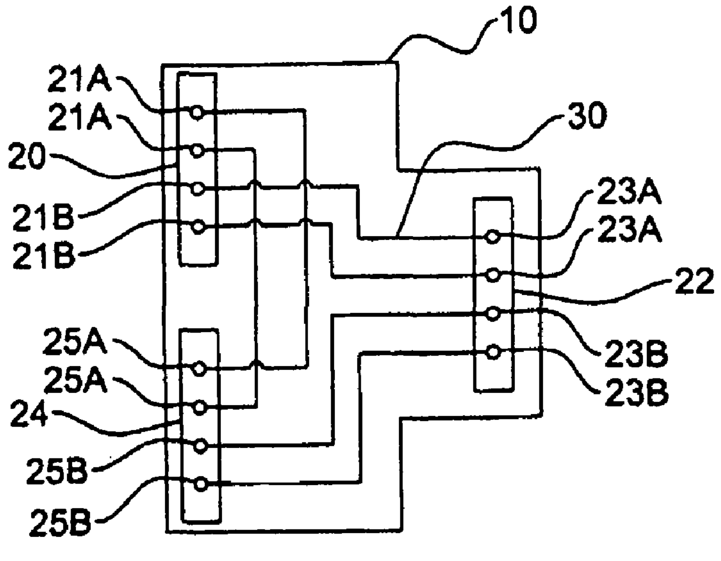
Figure 5E:
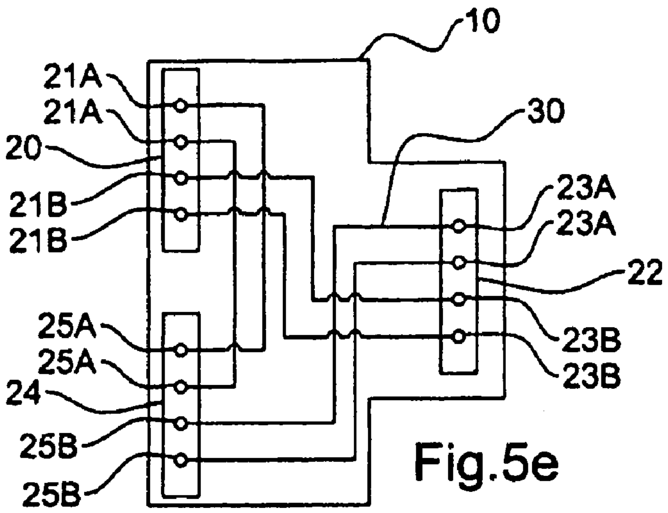
Figure 5F:
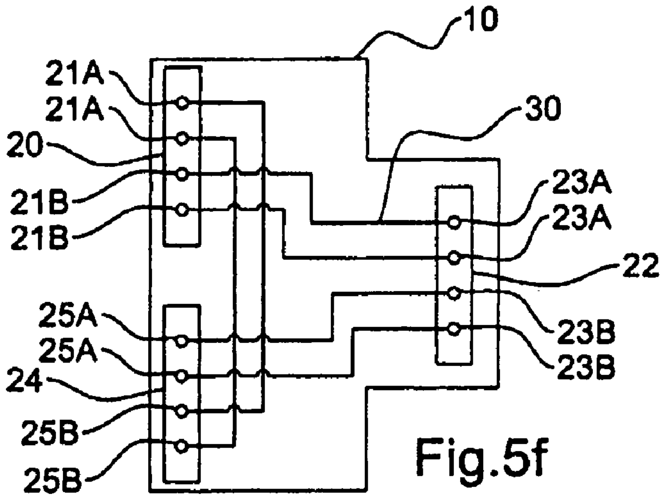
Figure 5G:
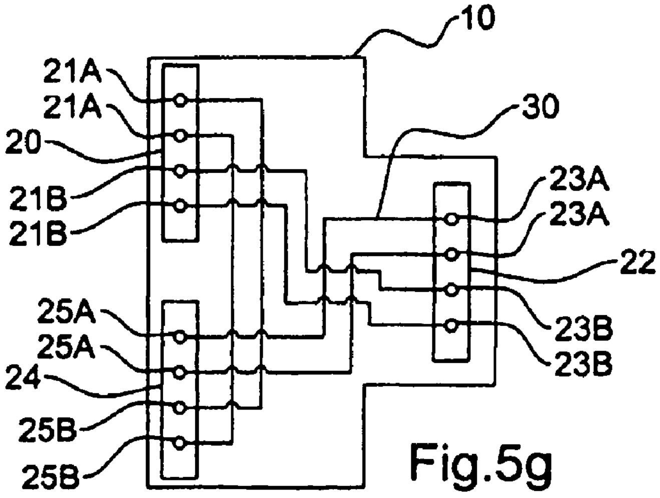

The connector device 110 can be any connector that is operative to maintain devices connected to it in a daisy chain configuration. For example, connector device 110 can be the connector device as shown in FIG. 4, which is a schematic illustration of a connector device 10. The connector device 10 illustrated allows network devices (not shown) to be connected by cables (not shown) to the connector device 10 in any fashion and the connector device 10 will ensure that the network devices 120 connected to the connector device 10 by cables will be in a daisy chain configuration. The connector device 10 comprises a first cable interface 20, a second cable interface 22, a third cable interface 24, and a connecting circuit 30.

The first cable interface 20, second cable interface 22 and third cable interface 24 are configured to be connectable with a cable comprising at least two conductors. The connector device illustrated in FIG. 4 is configured for a daisy chain network conforming to the RS-485 standard where each conductor is a twisted pair of copper wires and therefore each cable interface is shown as having four connections.

The connecting circuit 30 operably connects the conductors of the cables connected to the cable interfaces in such a manner that the daisy chain configuration of the network is maintained. For the embodiment of the connector device as shown in FIG. 4, the connecting circuit 30 operably connects the first wire pair of a cable connected at conductor connectors 21A of the first cable interface 20 of the connector device 10 to the first wire pair of another cable connected to conductor connectors 23A of the second cable interface 22 of the connector device 10. The second wire pair of a cable connected to conductor connectors 21B of the first cable interface 20 of the connector device 10 will be operably connected by the connecting circuit 30 to the second wire pair of another cable connected to the conductor connectors 25B of the third cable interface 24. Finally, the connecting circuit 30 operably connects the second wire pair of a cable connected to conductor connectors 23B of the second cable interface 22 to the first wire pair of a cable connected to a conductor connector 25A of the third cable interface 24.

Alternatively, connector device 110 could be a connector device as illustrated in FIGS. 5*a* through 5*g*.

The shorting plug 180 in FIG. 3 connects a pair of conductor connectors in an interface together when a cable is not connected to the interface. Using the shorting plug 180 will maintain the balance of the signal in the network, but is not strictly required.

Referring again to FIG. 3, each of the network devices 320A, 320B, 320C and 320D are connected by an interface 330A, 330B, 330C and 330D to one end of a cable 115A, 115B, 115C and 115D, respectively. The other end of each cable 115A, 115B, 115C and 115D is then connected to either a cable interface 270 or 280 on the master network device 220 or a connector 110. Network device 320A will be connected by a cable 115A to a connector 110. Another network device 320B will also be connected by another cable 115B to another interface on the connector 110. The connector 110 is connected by a cable 115E to cable interface 260 of the master network device 220. Network device 320C and network device 320D are each connected by a cable 115C and cable 115D directly to cable interfaces 270 and 280 of the master network device 220, respectively. Cable interface 290 is not used in the illustrated network 300 and has a shorting plug 180 inserted in it.

In operation network 300 operates as follows. Master network device 220 transmits a signal. The signal is transmitted out through conductor connector 262 of cable interface 260 and through a first conductor in the cable 115E. The signal is transmitted into connected device 110 and from connector device 110 through cable 115A and into network device 320A (if connector device 110 is the connector device illustrated in FIG. 4). The signal is then transmitted out of network device 320A through another conductor in the cable 115A and back into connector device 110. From connector device 110 the signal is transmitted through a first conductor in cable 115B to the network device 320B. The signal then passes back out of network device 320B through another conductor in cable 115B back and into connector device 110 where the signal is then transmitted back through another conductor in cable 115E and back into the master network device 220 through conductor connector 265 of cable interface 260 to conductor connector 272 of cable interface 270. The signal is then transmitted out of conductor connector 272 of cable interface 270 through a first conductor in the cable 115C and into network device 320C. From network device 320C the signal passes back though another conductor in cable 115C and back through conductor connector 275 of cable interface 270 to conductor connector 282 of cable interface 280. The signal is transmitted out of conductor connector 282 of cable interface 280 through a first conductor of cable 115D to network device 320D. From network device 320D, the signal is transmitted back through another conductor of cable 115D and back through conductor connector 285 of cable interface 280. The signal then passes through conductor connector 292 of cable interface 290, through shorting plug 190 to conductor connector 295, and then to input port 235 of the network component 230 to complete the daisy chain.

Figure 6:
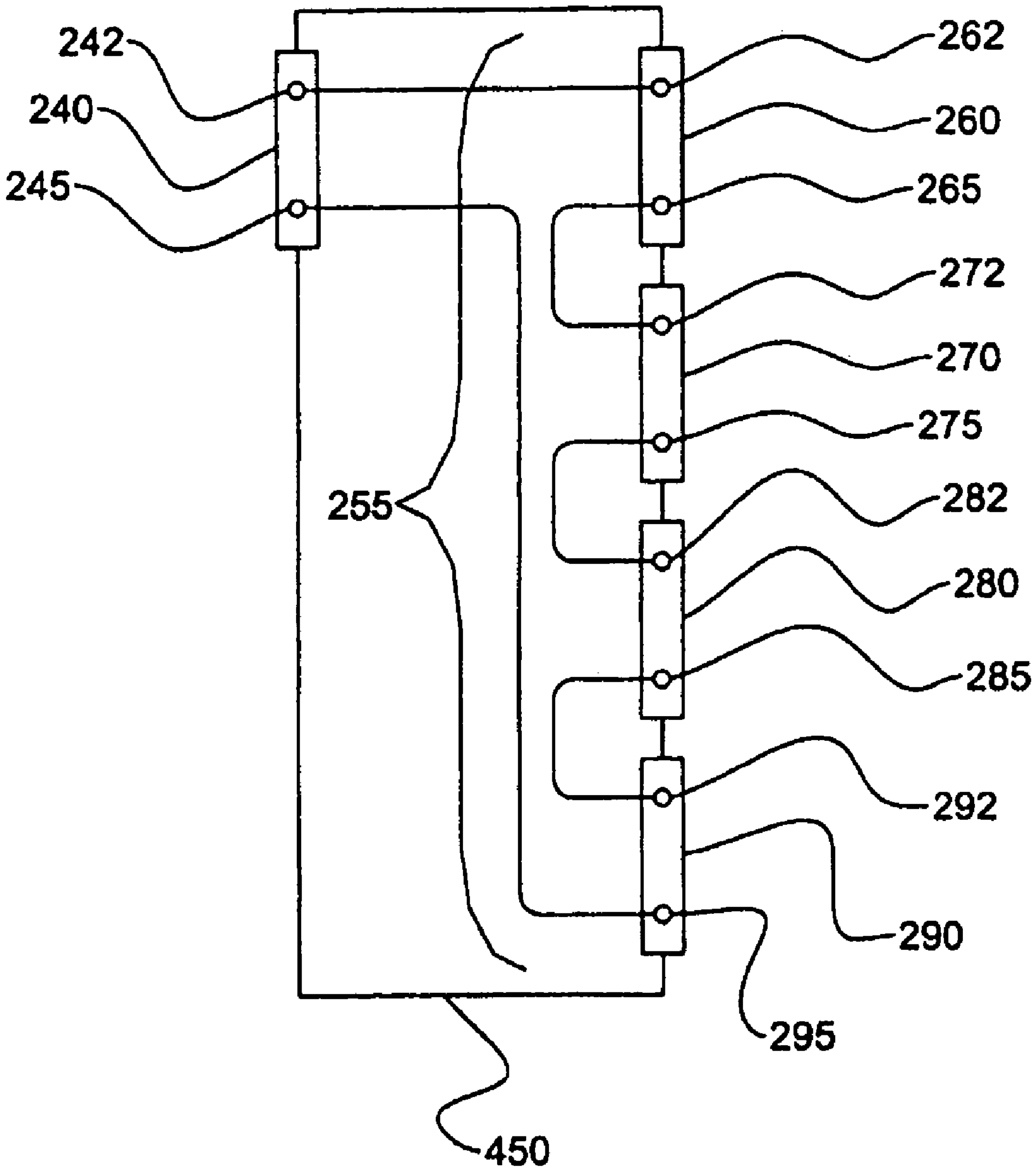
FIG. 6 illustrates a schematic of a connector hub in accordance with the present invention.

In another embodiment of the invention the connector hub is separate from the first network device. FIG. 6 illustrates a schematic of a connector hub 450 in accordance with the present invention. Connector hub 450, like connector hub 250 in FIG. 2 comprises: a first cable interface 260; a second cable interface 270; a third cable interface 280; and a fourth cable interface 290. Instead of being contained in the master network device with the network component, the connector hub 450 is connectable to a primary network device through a primary network device interface 240.

The primary network device interface 240 comprises an input conductor connector 242 and an output conductor connector 245 and the input conductor connector 242 and the output conductor connector 245 are operative to connect to conductors (not shown) from a primary network device (not shown). The primary network device that is connected by conductors to the primary network device interface 240 would typically be a master device if the daisy chain network is configured in a master/slave relationship, however it does not have to be. The conductors that connect the primary network device to the primary network device 240 could each comprises a single conductor and they could be wires (such as a twisted pair) or a printed circuit board wherein the primary network device interface 240 could connect to a slot on the primary network device. Alternatively, these two conductors could be enclosed in a single cable.

It will be readily understood by someone skilled in the art that the conductors could comprise a twisted wire pair and each conductor connector would be a pair of connectors to connect to each of the twisted wires in the pair.

In one embodiment of the invention, as illustrated in FIG. 8, the cable interfaces 260, 270, 280 and 290 would comprise a socket 602 that is adapted to receive a plug 604 that is attached to the end of a cable 115 that is connectable to the cable interface 260, 270, 280 or 290. For example, it is contemplated that the socket could be adapted to receive a plug conforming to the RJ45 standard that is attached to the end of a cable conforming to the category 5 standard for cable. When the plug is inserted into the socket and the connection is made, the conductor connectors will be connected with the proper conductors in the cable.

Although FIG. 6 illustrates a connector hub 450 comprising four cable interfaces for connecting to four cables, it is contemplated that any practical number of additional interfaces could be incorporated into the connector hub 250 in the manner shown.

Figure 7:
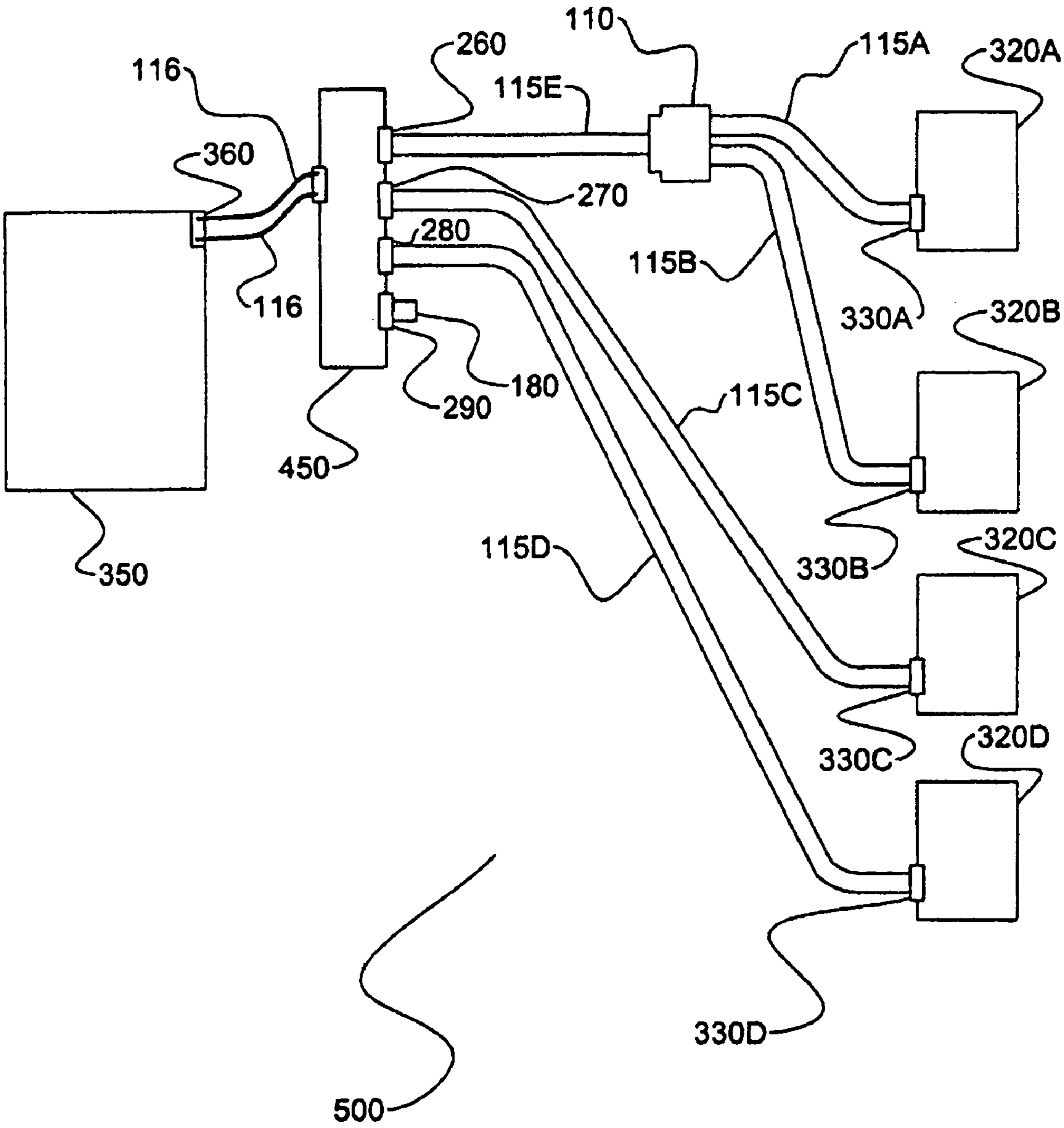
FIG. 7 illustrates of schematic illustration of daisy chain network implemented using a connector hub in accordance with the present invention.

FIG. 7 illustrates of schematic illustration of daisy chain configured network 500 implemented using the connector hub 450. Network 500 comprises: a primary network device 350; connector hub 450; a plurality of cables 115A, 115B, 115C, 115D, and 115E; a plurality of network devices 320A, 320B, 320C and 320D; a shorting plug 180 and a connector device 110. The network 500 operates in the same manner as the network 300 of FIG. 3

The cables 115A, 115B, 115C, 115D and 115E comprise a first end and a second end and have at least two conductors. If the cables 115A, 115B, 115C, 115D and 115E are for connected network devices 120 that operate in accordance with the RS-485 standard the two conductors will each be a twisted pair of copper wires and if the cable 115A, 115B, 115C, 115D and 115E is category 5 cable, the cable will consists of four copper wire pairs. The cables 115A, 115B, 115C, 115D and 115E could be terminated with any typical ends that allow connection to the components of the network 500, including the stripped wire ends, however, the ends would typically be RJ45 ends to allow quick snap connections to corresponding sockets in the components in the network 500.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A master network device for creating a network in a daisy chain configuration, the master network device comprising:

- a network component configured to operate on a daisy chain network and comprising an output port and an input port for connection to the daisy chain network; and
- a connector hub operative to connect a plurality of network devices in a daisy chain network, wherein each network device is connectable to the connector hub by a cable and each cable comprises two conductors, the connector hub comprising:
  - a plurality of sequential cable interfaces including a first cable interface and a last cable interface, each cable interface comprising a pair of conductor connectors, each conductor connector operative to connect one conductor of a connected cable to a connecting circuit, each cable interface connectable to a cable;
- wherein the connecting circuit is configured such that:
  - one of the conductor connectors of the first cable interface is connected to the output port of the network component and the other of the conductor connectors of the first cable interface is connected to one of the conductor connectors of a next cable interface;
  - the other of the conductor connectors of the next cable interface is connected to one of the conductor connectors of a succeeding cable interface, and
  - conductor connectors of the subsequent succeeding cable interfaces are connected sequentially in the same manner; and
  - the other of the conductor connectors of the last cable interface is connected to the input port of the network component,
  - and wherein when a network device is connected to each one of the interfaces of the network hub by a cable, the network devices are maintained in a daisy chain configuration by the connector hub.

2. The device of claim 1 wherein each conductor connector of each cable interface is operative to connect to a conductor that is a twisted wire pair.

3. The device of claim 1 wherein at least one of the cable interfaces is operative to connect to a category 5 cable.

4. The device of claim 1 wherein at least one cable interface comprises a socket adapted to receive a plug attached to an end of a cable, and wherein inserting the plug into the socket connects the conductors of the cable to the conductor connectors of the at least one cable interface.

5. The device of claim 4 wherein the plug and socket conform to the RJ45 standard.

6. The system of claim 1 wherein the network component is configured to operate on a network using the RS 485 standard.

7. The device of claim 1 wherein the network component comprises a second network connection operative to connect to a second network and the network component is operative to act as bridge from the second network to the daisy chain network.

8. The device of claim 7 wherein the network connection is an Ethernet connection.

9. The device of claim 7 wherein the network connection is a wireless connection.

10. The device of claim 7 wherein the network connection is an internet connection.

11. A daisy chain network comprising a master network device according to claim 1, and at least two network devices, wherein:

- each network device is operative to communicate as a node in a daisy chain network; and
- each network device is operatively connected by a cable to a cable interface of the master network device.

12. The network of claim 11 wherein each of the cable interfaces of the master network device not connected to a cable has a shorting plug inserted in the cable interface.

13. A daisy chain network comprising a master network device according to claim 1, and at least two network devices, wherein:

- each network device is operative to communicate as a node in a daisy chain network;
- each network device is operatively connected by a cable to one of a cable interface of the master network device and a connector device;
- and wherein each cable interface of each connector device is connected by a cable to one of a network device and another connector device.

14. The network of claim 13 wherein each of the cable interfaces of the master network device not connected to a cable has a shorting plug inserted in the cable interface.

15. A connector hub to connect a plurality of network devices in a daisy chain network, wherein each network device is connectable to the connector hub by a cable and wherein each cable comprises two conductors, the connector hub comprising:

- a connecting circuit;
- a primary network device interface comprising a pair of conductor connectors, each conductor connector operative to connect a conductor to the connecting circuit; and
- a plurality of sequential cable interfaces including a first cable interface and a last cable interface, each cable interface comprising a pair of conductor connectors, each conductor connector operative to connect one conductor of a connected cable to the connecting circuit, each cable interface connectable to a cable;
- wherein the connecting circuit is configured such that:
  - one of the conductor connectors of the first cable interface is connected to one of the conductor connectors of the primary network device interface and the other of the conductor connectors of the first cable interface is connected to one of the conductor connectors of a next cable interface and the other of the conductor connectors of the next cable interface is connected to one of the conductor connectors of a succeeding cable interface;

conductor connectors of the subsequent succeeding cable interfaces are connected sequentially in the same manner; and the other of the conductor connectors of the last cable interface is connected to the other conductor connector of the primary network device interface, and wherein when a network device is connected to each one of the interfaces of the network hub by a cable, the network devices are maintained in a daisy chain configuration by the connector hub.

16. The device of claim 15 wherein each conductor connector of each cable interface is operative to connect to a conductor that is a twisted wire pair.

17. The device of claim 15 wherein at least one of the cable interfaces is operative to connect to a category 5 cable.

18. The device of claim 15 wherein at least one cable interface comprises a socket adapted to receive a plug attached to an end of a cable, and wherein inserting the plug into the socket connects the conductors of the cable to the conductor connectors of the at least one cable interface.

19. The device of claim 18 wherein the plug and socket conform to the RJ45 standard.

20. The system of claim 15 wherein the network component is configured to operate on a network using the RS 485 standard.

21. A daisy chain network comprising: a connector hub according to claim 15; a primary network device; and at least two network devices, wherein:

the primary network device and each network device are operative to communicate as a node in a daisy chain network;

the primary network device is operatively connected to the primary network device interface of the connector hub; and each network device is operatively connected by a cable to a cable interface of the connector device.

22. The network of claim 21 wherein each of the cable interfaces of the connector hub not connected to a cable has a shorting plug inserted in the cable interface.

23. A daisy chain network comprising: a connector hub according to claim 15; a primary network device; and at least two network devices, wherein:

the primary network device and each network device are operative to communicate as a node in a daisy chain network;

the primary network device is operatively connected to the primary network device interface of the connector hub;

each network device is operatively connected by a cable to one of a cable interface of the master network device or a connector device; and wherein each cable interface of each connector device is connected by a cable to one of a network device and another connector device.

24. The network of claim 23 wherein each of the cable interfaces of the master network device not connected to a cable has a shorting plug inserted in the cable interface.

* * * * *